(12) United States Patent
Povey et al.

(10) Patent No.: US 8,700,400 B2
(45) Date of Patent: Apr. 15, 2014

(54) SUBSPACE SPEECH ADAPTATION

(75) Inventors: Daniel Povey, Redmond, WA (US); Kaisheng Yao, Newcastle, WA (US); Yifan Gong, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 12/982,401

(22) Filed: Dec. 30, 2010

(65) Prior Publication Data

US 2012/0173240 A1 Jul. 5, 2012

(51) Int. Cl.
*G10L 15/06* (2013.01)
*G10L 15/00* (2013.01)
*G10L 15/14* (2006.01)

(52) U.S. Cl.
USPC ................ 704/244; 704/243; 704/256.1

(58) Field of Classification Search
USPC ................................. 704/231–257
See application file for complete search history.

(56) References Cited

U.S. PATENT DOCUMENTS

| | | | | |
|---|---|---|---|---|
| 6,917,919 | B2 * | 7/2005 | Botterweck | 704/255 |
| 7,304,231 | B2 * | 12/2007 | van Pinxteren et al. | 84/615 |
| 7,340,396 | B2 | 3/2008 | Thomson et al. | 704/234 |
| 7,574,359 | B2 | 8/2009 | Huang | 704/244 |
| 7,729,909 | B2 | 6/2010 | Rigazio et al. | 704/233 |
| 7,881,931 | B2 * | 2/2011 | Wells et al. | 704/243 |
| 8,175,730 | B2 * | 5/2012 | Dittmar et al. | 700/94 |
| 8,406,525 | B2 * | 3/2013 | Ma et al. | 382/191 |
| 2001/0044719 | A1 * | 11/2001 | Casey | 704/245 |
| 2002/0123884 | A1 * | 9/2002 | Lin et al. | 704/201 |
| 2009/0024390 | A1 | 1/2009 | Deshmukh et al. | 704/236 |
| 2009/0276216 | A1 | 11/2009 | Amini et al. | 704/236 |

OTHER PUBLICATIONS

Patrick Nguyen et al.: "Maximum Likelihood Eigenspace and MLLR for Speech Recognition in Noisy Environment"—Published Date: 1999, pp. 1-4 http://citeseerx.ist.psu.edu/viewdoc/download?doi=10.1.1.129.2506&rep=rep1&type=pdf.

D. Giuliani et al.: "Speaker Normalization through Constrained MLLR Based Transforms"—Published Date: 2004, pp. 1-4. http://pfstar.itc.it/public/publications/itc-Icslp-2004-1.pdf.

Marc Ferras et al.: "Constrained MLLR for Speaker Recognition"—Published Date: 2007, pp. 1-4 ftp://tlp.limsi.fr/public/0400053.pdf.

Arnab Ghoshal et al.: "A Novel Estimation of Feature-Space MLLR for Full-Covariance Models"—Published Date: Mar. 2010 https://wiki.inf.ed.ac.uk/twiki/pub/CSTR/ListenSemester2_2009_10/ghoshal10_fmllr.pdf , pp. 1-4.

(Continued)

*Primary Examiner* — Jesse Pullias

(74) *Attorney, Agent, or Firm* — Steve Spellman; Jim Ross; Micky Minhas

(57) ABSTRACT

Subspace speech adaptation may be utilized for facilitating the recognition of speech containing short utterances. Speech training data may be received in a speech model by a computer. A first matrix may be determined for preconditioning speech statistics based on the speech training data. A second matrix may be determined for representing a basis for the speech to be recognized. A set of basis matrices may then be determined from the first matrix and the second matrix. Speech test data including a short utterance may then be received by the computer. The computer may then apply the set of basis matrices to the speech test data to produce a transcription. The transcription may represent speech recognition of the short utterance.

19 Claims, 3 Drawing Sheets

(56) References Cited

OTHER PUBLICATIONS

Wade Shen et al.: "Improved GMM-Based Language Recognition Using Constrained MLLR Transforms"—Published Date: 2008 http://www.ll.mit.edu/mission/commuinications/ist/publications/080330_Shen_ICASSP_GMM.pdf, pp. 1-4.

Daniel Povey: "A tutorial-style introduction to subspace gaussian mixture models for speech recognition", pp. 1-29. http://research.microsoft.com/apps/pubs/default.aspx?id=10191, Aug. 17, 2009.

* cited by examiner

SUBSPACE SPEECH ADAPTATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Various online services utilize computer applications to perform automatic speech recognition ("ASR") in completing various voice-activated functions initiated from a user's computer, such as the processing of information queries. During speech recognition, training and testing processes are utilized for utterances in order to improve accuracy. However, when training and testing processes are mismatched, speech recognition performance degrades drastically. Current solutions for addressing this problem include the use of speaker adaptation techniques for increasing performance. The speaker adaptation techniques may include the transformation of observed speech features or, alternatively, the adaptation of Hidden Markov Model ("HMM") speech parameters. Current speaker adaptation techniques, however, have been shown to be deficient with the short utterances often contained in speech utilized for making online voice information queries. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for utilizing subspace speech adaptation for the recognition of speech. Speech training data may be received in a speech model. A first matrix may be determined for preconditioning speech statistics based on the speech training data. A second matrix may be determined for representing a basis for the speech to be recognized. A set of basis matrices may then be determined from the first matrix and the second matrix. Speech test data, which may include a short utterance, may be received by the computer. The computer may then apply the set of basis matrices to the speech test data to produce a transcription. The transcription may represent speech recognition of the received speech test data.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for utilizing subspace speech adaptation for the recognition of speech. A speech model may be received by a computing device. Speech training data may be received in a speech model. A first matrix may be determined for preconditioning speech statistics based on the speech training data. A second matrix may be determined for representing a basis for the speech to be recognized. A set of basis matrices may then be determined from the first matrix and the second matrix. Speech test data, which may include a short utterance, may be received by the computer. The computer may then apply the set of basis matrices to the speech test data to produce a transcription. The transcription may represent speech recognition of the received speech test data.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
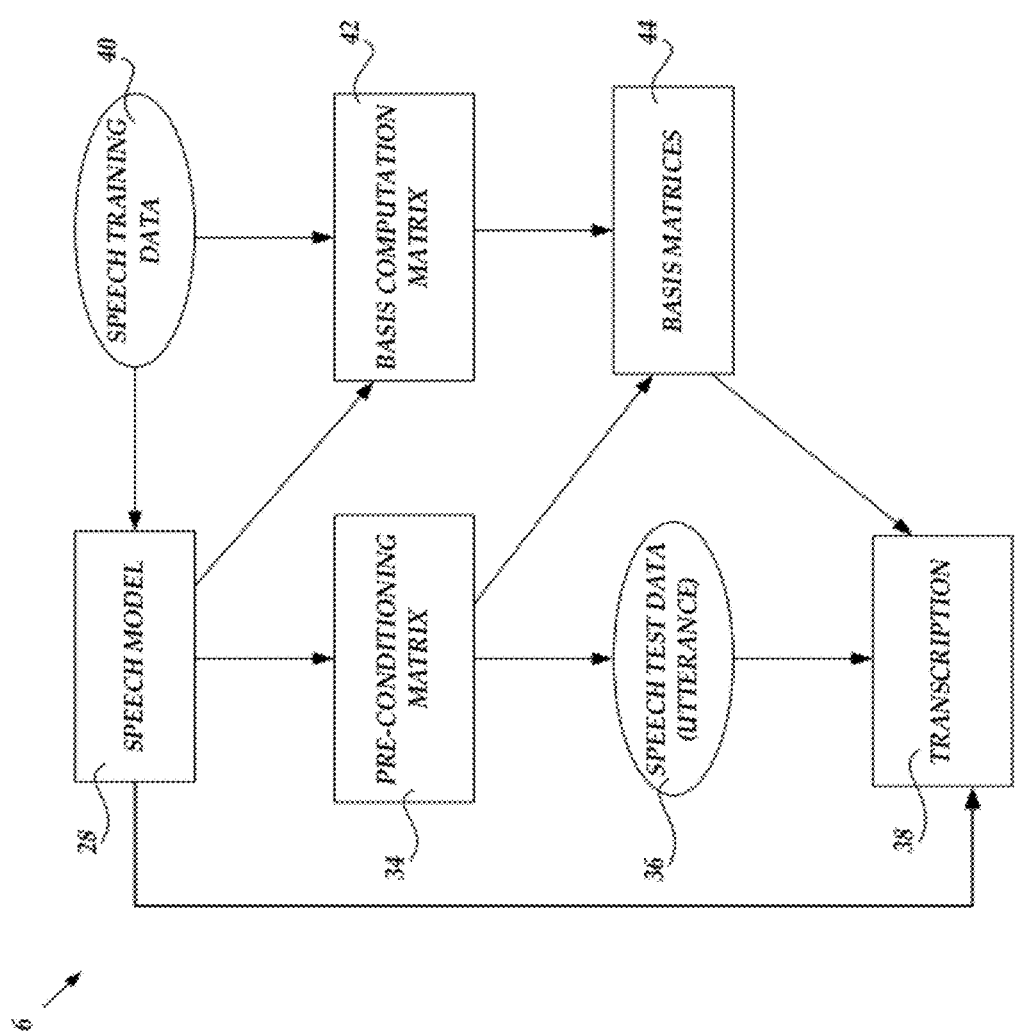
FIG. 1 is a block diagram illustrating a data flow for the utilization of subspace speech adaptation for the recognition of speech, in accordance with various embodiments.

Referring now to the drawings, in which like numerals represent like elements through the several figures, various aspects of the present invention will be described. FIG. 1 is a block diagram illustrating a data flow 6 for the utilization of subspace speech adaptation for the recognition of speech, in accordance with various embodiments. The data flow 6 includes a speech model 28 for receiving speech training data 40. The speech training data 40 may comprise acoustic speech data used to train a speech recognition system. In accordance with an embodiment, the speech model 28 may comprise a Hidden Markov Model-Gaussian Mixture Model ("HMM-GMM") speech model. HMM-GMM speech models are known to those skilled in the art. The output of the speech model 28 may then received by a pre-conditioning matrix 34. In accordance with an embodiment, the pre-conditioning matrix 34 may comprise a "Cholesky" matrix and may be utilized for preconditioning speech statistics based on the speech training data 40. The speech training data 40 and the speech model 28 may also be utilized by the basis computation matrix 42. In accordance with an embodiment, the basis computation matrix 42 may utilize speech statistics for training a basis. The basis computation matrix 42 will be discussed in greater detail below with respect to FIG. 3. The output of the pre-conditioning matrix 34 and the basis computation matrix 42 may be utilized to compute a set of basis matrices 44. In accordance with an embodiment, the basis matrices 44 may be utilized by a speech recognition application to produce a transcription 38 of speech test data 38. The basis matrices 44 will be discussed in greater detail below with respect to FIG. 3. The data flow 6 also includes the speech test data 36 which may include one or more utterances, including, but not limited to, short utterances (between one and two words in length), medium utterances (between three and sixty words in length) and long utterances (more than sixty words in length). In accordance with an embodiment, the speech test data 36 may comprise acoustic ("real-world") speech data received from one or more speakers. The transcription 38 may include speech recognition of the speech test data 36 and may be in the form of a voice-to-text or video-to-text transcription of short, medium and/or long utterances.

Exemplary Operating Environment

Figure 2:
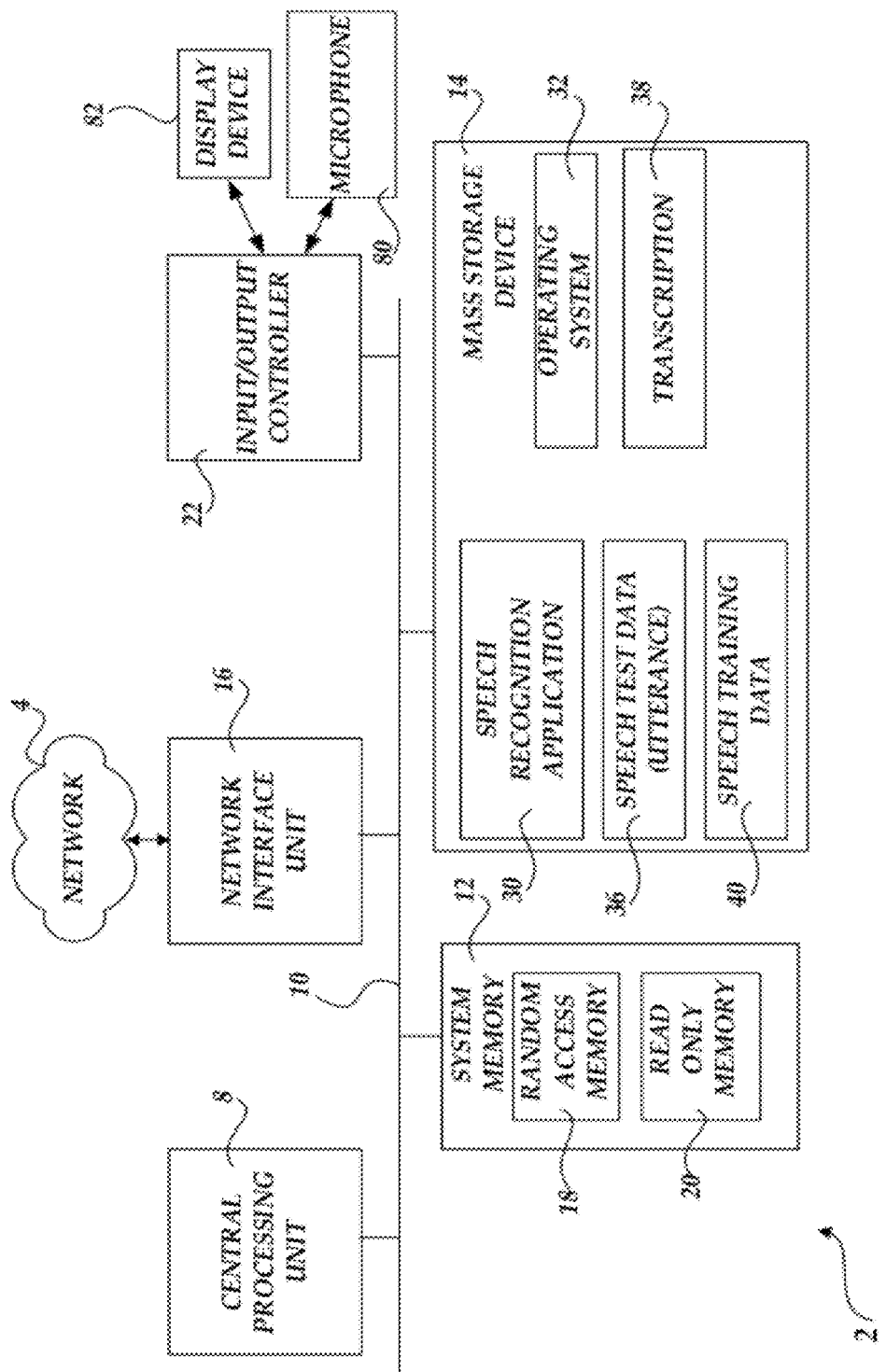
FIG. 2 is a block diagram illustrating a computing environment which may be utilized for utilizing subspace speech adaptation for the recognition of speech, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a computing device, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

Figure 3:
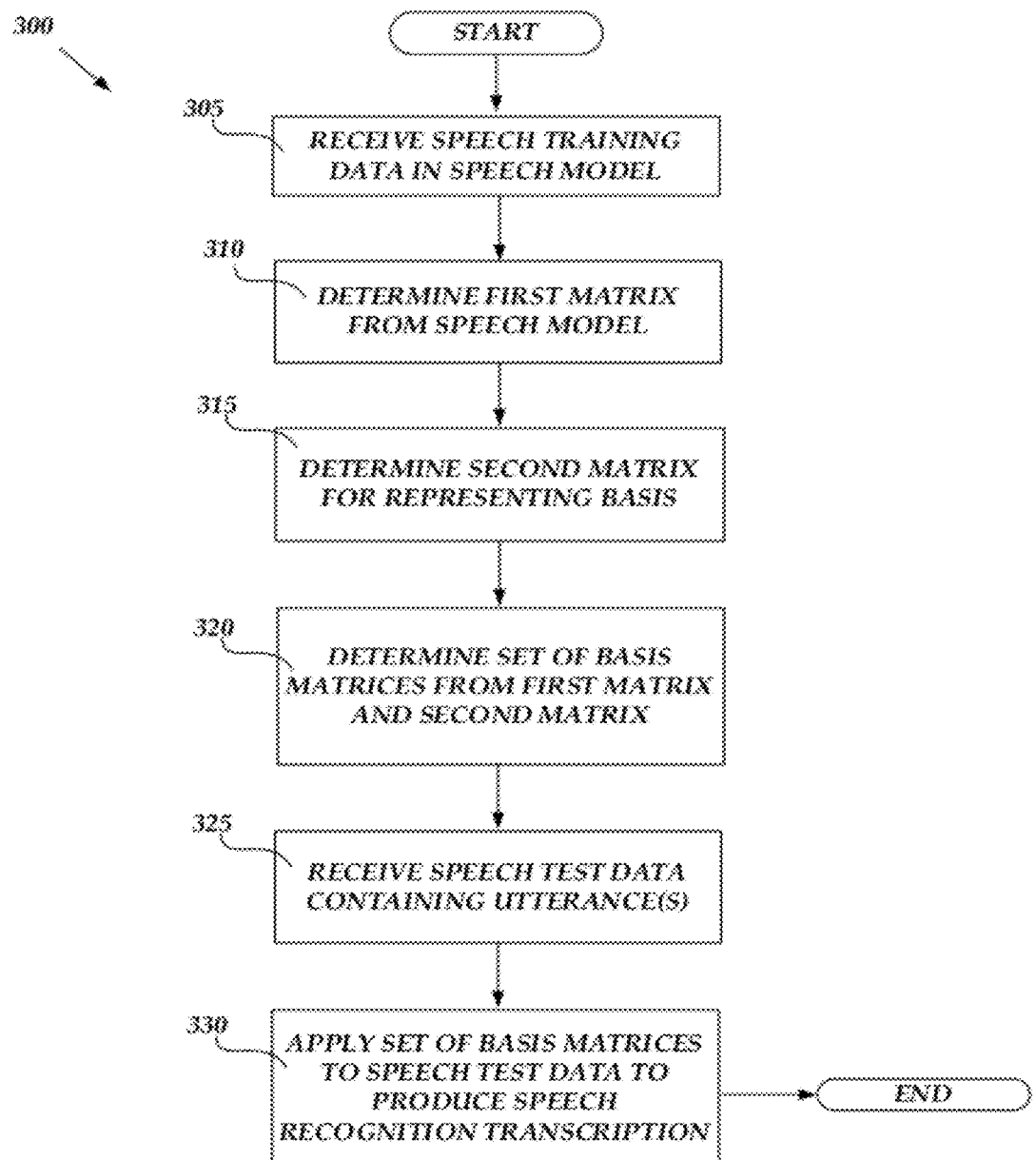
FIG. 3 is a flow diagram illustrating a routine for utilizing subspace speech adaptation for the recognition of speech, in accordance with various embodiments.

FIG. 3 shows the computer 2 which may include a desktop, laptop, server, tablet, mobile computing device (e.g., a smartphone) or other type of computer capable of executing one or more application programs. The computing device 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, a speech recognition application 30, the speech test data 36, the speech training data 40, and the transcription 38. In accordance with an embodiment, the speech recognition application 30 may comprise computer executable instructions for utilizing subspace speech adaptation for the recognition of speech. The speech recognition application may comprise the BING application utilizing TELLME voice search services from MICROSOFT CORPORATION of Redmond, Wash. It should be appreciated, however, that other speech recognition application programs and voice search services from other manufacturers may be utilized in accordance with the various embodiments described herein.

In accordance with various embodiments, the operating system 32 may be suitable for controlling the operation of a networked personal computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the computer 2. The term computer-readable media as used herein may include computer storage media.

Computer storage media may include volatile and nonvolatile, removable and non-removable media implemented in any method or technology for storage of information, such as computer readable instructions, data structures, program modules, or other data. Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computer 2. Any such computer storage media may be part of the computer 2.

The term computer-readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

According to various embodiments of the invention, the computer 2 may operate in a networked environment using logical connections to remote computers through a network 4 which may include a local network or a wide area network (e.g., the Internet). The computer 2 may connect to the network 4 through a network interface unit 16 connected to the bus 10. It should be appreciated that the network interface unit 16 may also be utilized to connect to other types of networks and remote computing systems. The computer 2 may also include the input/output controller 22 for receiving and processing input from a number of input types, including a microphone 80 as well as a keyboard, mouse, pen, stylus, finger, and/or other means (not shown). Similarly, an input/output controller 22 may provide output to a display device 82 as well as a printer, or other type of output device (not shown).

FIG. 3 is a flow diagram illustrating a routine for utilizing subspace speech adaptation for the recognition of speech, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 3 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the speech recognition application 30, executing on the computer 2, receives the speech training data 40 in the speech model 28.

From operation 305, the routine 300 continues to operation 310, where the speech recognition application 30 determines a first matrix (i.e., the pre-conditioning matrix 34) from the speech model 28. In accordance with an embodiment, the pre-conditioning matrix 34 may comprise a Cholesky matrix "C" which may be determined as follows:

1. Compute an initial matrix, having the variable "H", as $H=H^1+H^2$
2. Set $H^1=0$
3. then for $1\leq i, j\leq D$, set $h^{(1)}_{((i-1)(D+1)+j),(j-1)(D+1)+i)}=1$
4. $H^2$ may then be approximated using: $H^{(2)} \simeq \text{diag}(\overline{G}_1, \overline{G}_2, \ldots \overline{G}_D)$ The Cholesky matrix C may then be computed as $H=CC^T$
In the above equations, $H^2$ is approximated as the diagonal components of a matrix $\overline{G}_1, \overline{G}_2, \ldots \overline{G}_D$ comprising computed expected values of speech statistics, "j" represents one or more speaker states, "i" represents a matrix row and "D" represents a matrix dimension.

From operation 310, the routine 300 continues to operation 315, where the speech recognition application 30 determines a second matrix (i.e., a matrix "M") for representing a basis. In particular, the speech recognition application 30 may compute a basis for use in the subspace speech adaptation for the recognition of speech as follows:

1. First-order statistics $\rho^s$ for every speaker whose speech is to be recognized.
2. A singular value decomposition ("SVD") is then performed on the first-order statistics $\rho^s$.
3. $\rho^s$ is then normalized by the inverse of the Cholesky matrix $C^{-1}$ as $\hat{\rho}^s = C^{-1}\rho^s$.
4. The second matrix "M" may then be computed as:

$$M = \sum_s \frac{1}{\beta^{(s)}} \rho^{(s)} \rho^{(s)T}$$

and is singular-value decomposed as $ULV^T$.
In the above equations, "$\beta^{(s)}$" represents one or more speaker-specific statistics, "U" represents an eigen vector and "L" represents a diagonal matrix. It should be understood that the second matrix "M" may be computed to train the basis.

From operation 315, the routine 300 continues to operation 320, where the speech recognition application 30 determines the set of basis matrices 44 from the first matrix and the second matrix. In particular, the speech recognition application 30 may determine set of basis matrices 44 in a vectorized form. For example, in accordance with an embodiment, the set of basis matrices 44, which may be represented as $\{W_b, 1\leq b\leq D(D+1)\}$, are represented in a vector form as: $\text{vec}(W_b^T)=C^{-T}u_b$ (i.e., the first matrix "C"), where $u_b$ is the b'th column of the eigenvector U in the second matrix "M".

From operation 320, the routine 300 continues to operation 325, where the speech recognition application 30 receives the speech test data 36 from one or more speakers. In accordance with an embodiment, the speech test data 36 may contain short utterances (i.e., utterances of one or two words in length).

From operation 320, the routine 325 continues to operation 330, where the speech recognition application 30 applies or utilizes the set of basis matrices 44 determined at operation 320, to produce the transcription 38. The transcription 38 may represent adapted speech recognition of the utterance received in the speech test data 36 at operation 325. It should be understood that the transcription 38 may be produced at a "test time" in which the received speech test data 36 is utilized to optimize coefficients associated with adapted speech recognition. In applying or utilizing the set of basis matrices 44, the speech recognition application 30 may determine a basis size for a speaker based on an amount of available speaker adaptation data and compute coefficients for the basis size. In accordance with an embodiment, the coefficients may be computed by repeated line search in a gradient direction. In accordance with various embodiments, the following equation may be utilized to determine a number of coefficients to use in determining a basis size:

$$B(s)=\min([\eta \beta^{(s)}], D(D+1))$$

In the above equation, "$\eta$" represents a constant set by hand (e.g., $\eta=0.2$) that determines how many speech parameters to add for each new frame of speech data and "D(D+1)" represents the size of the parameter space. In accordance with an embodiment, the gradient direction may be determined by computing weights of a set of eigen vectors as an inner product of the direction with eigen vectors. Thus, the final gradient direction is the weighted average of all of the eigen vectors, with weights estimated before. Furthermore, the gradient direction updates a feature space transformation associated with subspace speech adaptation, in accordance with an embodiment. It should be understood that varying the number of a basis may be decided according to a number of observations. From operation 330, the routine 300 then ends.

It should be understood, that in accordance with the embodiments described herein, speaker adaptation techniques may be improved when dealing with speech test data, including short utterances. It should further be understood that the embodiments described herein use a basis representation of a feature transformation matrix, in which the variation between speakers is concentrated in the leading coefficients. The variation (i.e., variability) between speakers includes distortion with respect to the acoustic model (including channel, noise and speaker characteristics). When adapting to a speaker, the embodiments described herein enable the selection of a variable number of coefficients to estimate depending on the amount of adaptation data available, and assigns a zero value to the remaining coefficients. It should be appreciated that the embodiments described herein may improves performance when the amount of adaptation data is limited while retaining the same asymptotic performance as conventional speaker adaptation techniques such as constrained maximum likelihood linear regression ("CMLLR") and representing an improvement over the performance of existing approaches such as feature space maximum a posteriori linear regression ("fMAPLR") and an improvement over the efficiency of conventional CMLLR estimation.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of subspace speech adaptation for the recognition of speech, comprising:
   receiving, by the computer, speech training data in a speech model;
   determining, by the computer, a first matrix for preconditioning speech statistics based on the speech training data;
   determining, by the computer, a second matrix for representing a basis;
   determining, by the computer, a plurality of basis matrices from the first matrix and the second matrix;
   receiving, by the computer, speech test data comprising at least one utterance;

applying, by the computer, the plurality of basis matrices to the speech test data to produce a transcription, the transcription representing speech recognition of the at least one utterance, the transcription being produced during a period in which the received speech training data is utilized to optimize one or more coefficients associated with adapted speech recognition.

2. The method of claim 1, wherein determining, by the computer, a first matrix for preconditioning speech statistics comprises computing a Cholesky matrix, wherein the speech model comprises a Hidden Markov Model-Gaussian Mixture Model speech model.

3. The method of claim 1, wherein determining, by the computer, a second matrix for representing a basis comprises:
   accumulating a plurality of statistics for at least one speaker of the at least one utterance;
   performing a singular value decomposition on the accumulated plurality of statistics for the at least one speaker of the at least one utterance;
   normalizing the plurality of statistics; and
   computing the second matrix based on the normalized statistics.

4. The method of claim 1, wherein determining, by the computer, a plurality of basis matrices from the first matrix and the second matrix comprises determining a plurality of basis matrices in a vectorized form.

5. The method of claim 1, wherein receiving, by the computer, speech test data comprising at least one utterance comprises receiving at least one short utterance.

6. The method of claim 1, wherein applying, by the computer, the plurality of basis matrices to the speech test data to produce a transcription, the transcription representing speech recognition of the at least one utterance, comprises:
   determining a basis size for a speaker based on an amount of available speaker adaptation data; and
   computing a plurality of coefficients for the basis size, wherein the plurality of coefficients are computed by utilizing a repeated line search in a gradient direction.

7. The method of claim 6, wherein computing a plurality of coefficients for the basis size, wherein the plurality of coefficients are computed by utilizing a repeated line search in a gradient direction, comprises:
   computing weights of each of a plurality of eigen vectors as an inner product of the direction with the plurality of eigen vectors; and
   determining the gradient direction from a weighted average of the plurality of eigen vectors.

8. A computer system for utilizing subspace speech adaptation for the recognition of speech, comprising:
   a memory for storing executable program code; and
   a processor, functionally coupled to the memory, the processor being responsive to computer-executable instructions contained in the program code and operative to:
      receive speech training data in a speech model;
      determine a first matrix for preconditioning speech statistics based on the speech training data;
      determine a second matrix for representing a basis;
      determine a plurality of basis matrices from the first matrix and the second matrix;
      receive speech test data comprising at least one utterance;
      apply the plurality of basis matrices to the speech test data to produce a transcription, the transcription representing speech recognition of the at least one utterance, the transcription being produced during a period in which the received speech training data is utilized to optimize one or more coefficients associated with adapted speech recognition.

9. The system of claim 8, wherein the processor, in determining a first matrix for preconditioning speech statistics, is operative to compute a Cholesky matrix, wherein the speech model comprises a Hidden Markov Model-Gaussian Mixture Model speech model.

10. The system of claim 8, wherein the processor, in determining a second matrix for representing a basis, is operative to:
    accumulate a plurality of statistics for at least one speaker of the at least one utterance;
    perform a singular value decomposition on the accumulated plurality of statistics for the at least one speaker of the at least one utterance;
    normalize the plurality of statistics; and
    compute the second matrix based on the normalized statistics.

11. The system of claim 8, wherein the processor, in determining a plurality of basis matrices from the first matrix and the second matrix, is operative to determine a plurality of basis matrices in a vectorized form.

12. The system of claim 8, wherein the processor, in receiving speech test data comprising at least one utterance, is operative to receive at least one short utterance.

13. The system of claim 8, wherein the processor, in applying the plurality of basis matrices to the speech test data to produce a transcription, the transcription representing speech recognition of the at least one utterance, is operative to:
    determine a basis size for a speaker based on an amount of available speaker adaptation data; and
    compute a plurality of coefficients for the basis size, wherein the plurality of coefficients are computed by utilizing a repeated line search in a gradient direction.

14. The system of claim 13, wherein the processor, in computing a plurality of coefficients for the basis size, wherein the plurality of coefficients are computed by utilizing a repeated line search in a gradient direction, is operative to:
    compute weights of each of a plurality of eigen vectors as an inner product of the direction with the plurality of eigen vectors; and
    determine the gradient direction from a weighted average of the plurality of eigen vectors.

15. A computer-readable storage medium comprising computer executable instructions which, when executed on a computer, will cause the computer to perform a method of subspace speech adaptation for the recognition of speech, comprising:
    receiving speech training data in a speech model;
    determining a first matrix for preconditioning speech statistics based on the speech training data;
    determining a second matrix for representing a basis;
    determining a plurality of basis matrices from the first matrix and the second matrix;
    receiving speech test data comprising a short utterance;
    applying the plurality of basis matrices to the speech test data to produce a transcription, the transcription representing speech recognition of the short utterance, by:
       determining a basis size for a speaker based on an amount of available speaker adaptation data and
       computing a plurality of coefficients for the basis size, wherein the plurality of coefficients are computed by utilizing a repeated line search in a gradient direction.

16. The computer-readable storage medium of claim 15, wherein determining a first matrix for preconditioning speech statistics comprises computing a Cholesky matrix, wherein the speech model comprises a Hidden Markov Model-Gaussian Mixture Model speech model.

17. The computer-readable storage medium of claim 15, wherein determining a second matrix for representing a basis comprises:
    accumulating a plurality of statistics for at least one speaker of the at least one utterance;
    performing a singular value decomposition on the accumulated plurality of statistics for the at least one speaker of the at least one utterance;
    normalizing the plurality of statistics; and
    computing the second matrix based on the normalized statistics.

18. The computer-readable storage medium of claim 15, wherein determining a plurality of basis matrices from the first matrix and the second matrix comprises determining a plurality of basis matrices in a vectorized form.

19. The computer-readable storage medium of claim 15, wherein computing a plurality of coefficients for the basis size, wherein the plurality of coefficients are computed by utilizing a repeated line search in a gradient direction, comprises:
    computing weights of each of a plurality of eigen vectors as an inner product of the direction with the plurality of eigen vectors; and
    determining the gradient direction from a weighted average of the plurality of eigen vectors.

* * * * *